(12) United States Patent
Hildebrand

(10) Patent No.: US 7,455,141 B2
(45) Date of Patent: Nov. 25, 2008

(54) TRACK DRIVE SYSTEM

(76) Inventor: William B. E. Hildebrand, 795 3rd Avenue, Prince George, British Columbia (CA) V2L 3C6

( * ) Notice: Subject to any disclaimer, the term of this patent is extended or adjusted under 35 U.S.C. 154(b) by 427 days.

(21) Appl. No.: 11/277,405

(22) Filed: Mar. 24, 2006

(65) Prior Publication Data

US 2006/0213700 A1 Sep. 28, 2006

Related U.S. Application Data

(60) Provisional application No. 60/664,947, filed on Mar. 25, 2005.

(51) Int. Cl.
*B62D 55/00* (2006.01)

(52) U.S. Cl. .................. 180/190; 180/193; 180/9.5; 180/9.54

(58) Field of Classification Search ............ 180/9.5, 180/9.54, 190, 193; 305/129, 130, 131, 134, 305/135, 141, 142
See application file for complete search history.

(56) References Cited

U.S. PATENT DOCUMENTS

| | | | |
|---|---|---|---|
| 5,279,381 A * | 1/1994 | Fukuda | 180/190 |
| 5,947,220 A | 9/1999 | Oka et al. | |
| 6,234,264 B1 | 5/2001 | Boivin et al. | |
| 6,237,706 B1 | 5/2001 | Karpik et al. | |
| 6,450,279 B1 | 9/2002 | Imamura | |
| 6,467,561 B1 | 10/2002 | Bolvin et al. | |
| 6,595,309 B1 | 7/2003 | Savage et al. | |
| 6,601,664 B2 * | 8/2003 | Hiraki et al. | 180/9.5 |
| 6,715,575 B2 | 4/2004 | Karpik | |
| 7,040,426 B1 * | 5/2006 | Berg | 180/9.5 |
| 2005/0016784 A1 | 1/2005 | Fecteau | |

* cited by examiner

*Primary Examiner*—John Q. Nguyen
*Assistant Examiner*—Jacob Knutson
(74) *Attorney, Agent, or Firm*—Oyen Wiggs Green & Mutala LLP

(57) ABSTRACT

A track drive system comprises a chassis frame and a drive wheel rotatably coupled to the chassis frame. An upper idler is rotatably coupled to the chassis frame rearwardly of the drive wheel. A forward idler is rotatably coupled to the chassis frame below the drive wheel. A suspended frame is pivotally coupled to the chassis frame by upper and lower swing arms. A rear idler is rotatably coupled to a rear portion of the suspended frame at a location displaced generally downwardly from an attachment point of the upper swing arm by a rear idler offset distance. A lower idler is rotatably coupled to a forward portion of the suspended frame. A biasing means biases the suspended frame away from the chassis frame.

20 Claims, 6 Drawing Sheets

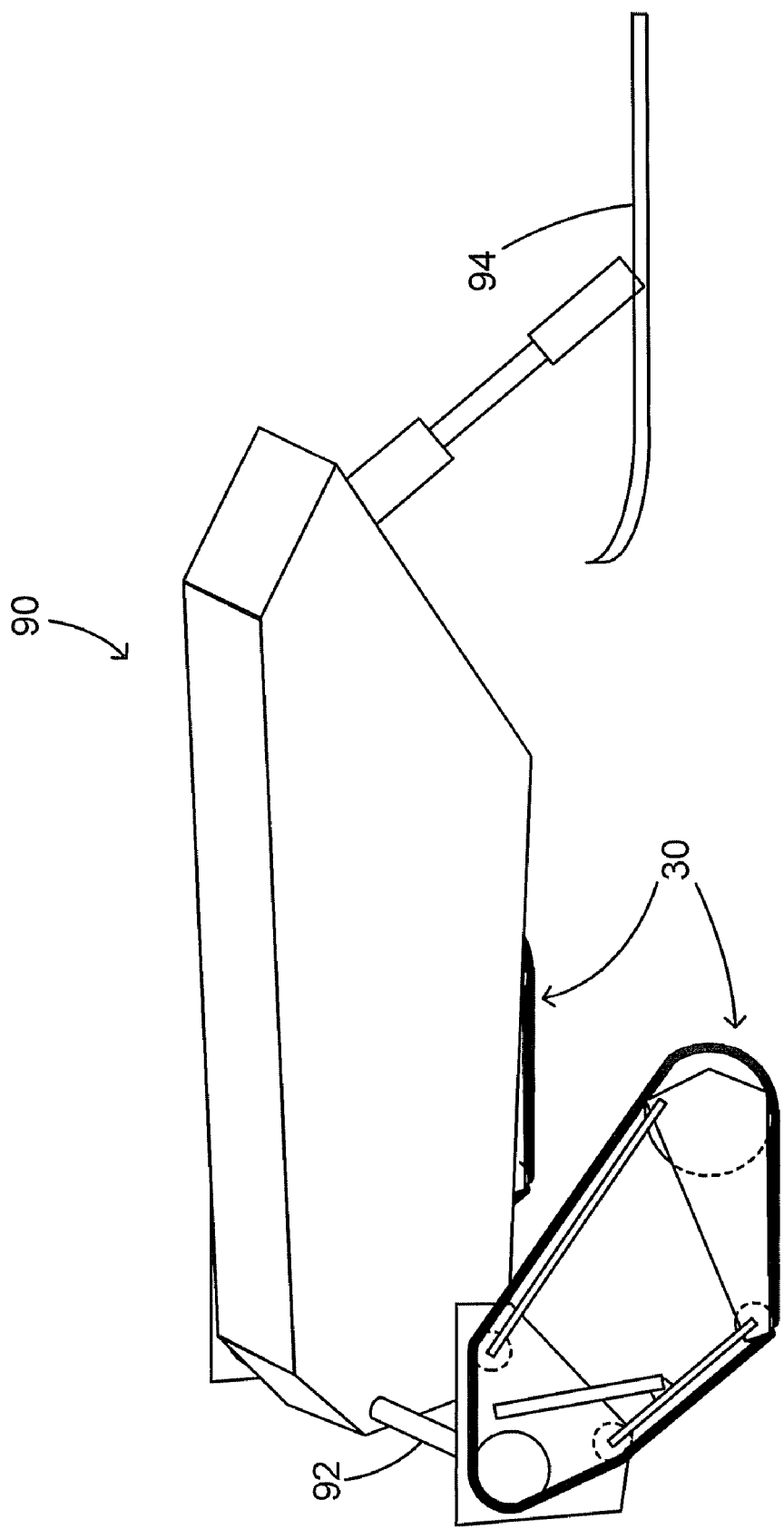

TRACK DRIVE SYSTEM

REFERENCE TO RELATED APPLICATION

This application claims priority from U.S. provisional patent application No. 60/664,947, filed 25 Mar. 2005 and entitled "TRACK DRIVE SYSTEM."

TECHNICAL FIELD

The invention relates to track drive systems, and particularly to track drive systems which incorporate suspension systems.

BACKGROUND

In vehicles which have track drive systems, it is often desirable to provide a suspension system which absorbs some of the force of impacts to the track drive system. However, it can be a challenge to incorporate a suspension system into a track drive system without adversely affecting the operation of the track drive system.

In order for a track drive system to function properly, a certain level of tension must generally be maintained in the track to prevent the track from slipping relative to the mechanism which drives the track. In some prior art track drive systems which incorporate suspension systems, compression of the suspension system can reduce tension in the track, which can result in slipping and a temporary loss of forward acceleration of the vehicle driven by the track drive system.

There exists a need for track drive systems which incorporate suspension systems that maintain tension in the track when the suspension system is compressed.

SUMMARY OF THE INVENTION

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

One aspect of the invention provides a track drive system comprising a chassis frame, a drive wheel rotatably coupled to the chassis frame, an upper idler rotatably coupled to the chassis frame rearwardly of the drive wheel, a forward idler rotatably coupled to the chassis frame below the drive wheel, a suspended frame, a rear idler rotatably coupled to a rear portion of the suspended frame, a lower idler rotatably coupled to a forward portion of the suspended frame, an upper swing arm having forward and rearward ends, the upper swing arm pivotally coupled at the forward end thereof to the chassis frame, and pivotally coupled at the rearward end thereof to the suspended frame at a location displaced generally upwardly from an axis of the rear idler by a rear idler offset distance, a lower swing arm having forward and rearward ends, the lower swing arm pivotally coupled at the forward end thereof to the chassis frame and pivotally coupled at the rearward end thereof to the suspended frame, and, a biasing means for biasing the suspended frame away from the chassis frame. The suspended frame is moveable between an extended position and a compressed position. A perimeter defined around the drive wheel, upper idler, rear idler, lower idler and forward idler remains substantially constant as the suspended frame moves between the extended position and the compressed position.

In addition to the exemplary aspects and embodiments described above, further aspects and embodiments will become apparent by reference to the drawings and by study of the following detailed description.

BRIEF DESCRIPTION OF DRAWINGS

Exemplary embodiments are illustrated in referenced figures of the drawings. It is intended that the embodiments and figures disclosed herein are to be considered illustrative rather than restrictive.

In drawings which illustrate non-limiting embodiments of the invention.

DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

One embodiment of the invention provides a track drive system for a vehicle having a chassis and an engine attached to the chassis. The drive system may be bolted or otherwise detachably secured to the chassis. Alternatively, the track drive system may be permanently affixed to the chassis.

The track drive system comprises a drive wheel rotatably attached to a chassis frame. The drive wheel is coupled to be driven by the engine. Upper and forward idlers are also rotatably attached to the chassis frame. A suspended frame is coupled to the chassis frame by means of upper and lower swing arms. A rear idler and a lower idler are rotatably attached to the suspended frame. The rear idler has an axis which is offset from a location at which the upper swing arm is pivotally attached to the suspended frame in a generally downward direction by a rear idler offset distance.

The suspended frame is moveable between an extended position and a compressed position. A biasing means is provided to bias the suspended frame downwardly from the chassis frame towards the extended position. A track is positioned around the drive wheel, upper idler, rear idler, lower idler and forward idler. The track can be driven to circulate by rotation of the drive wheel.

The track has a length selected such that there is tension in the track when it is in place. The rear idler offset enables tension in the track to be substantially maintained as the suspended frame moves between the extended and compressed positions. A ground-contacting portion of the track remains substantially horizontal as the suspended frame moves between the extended and compressed positions.

Figure 1:
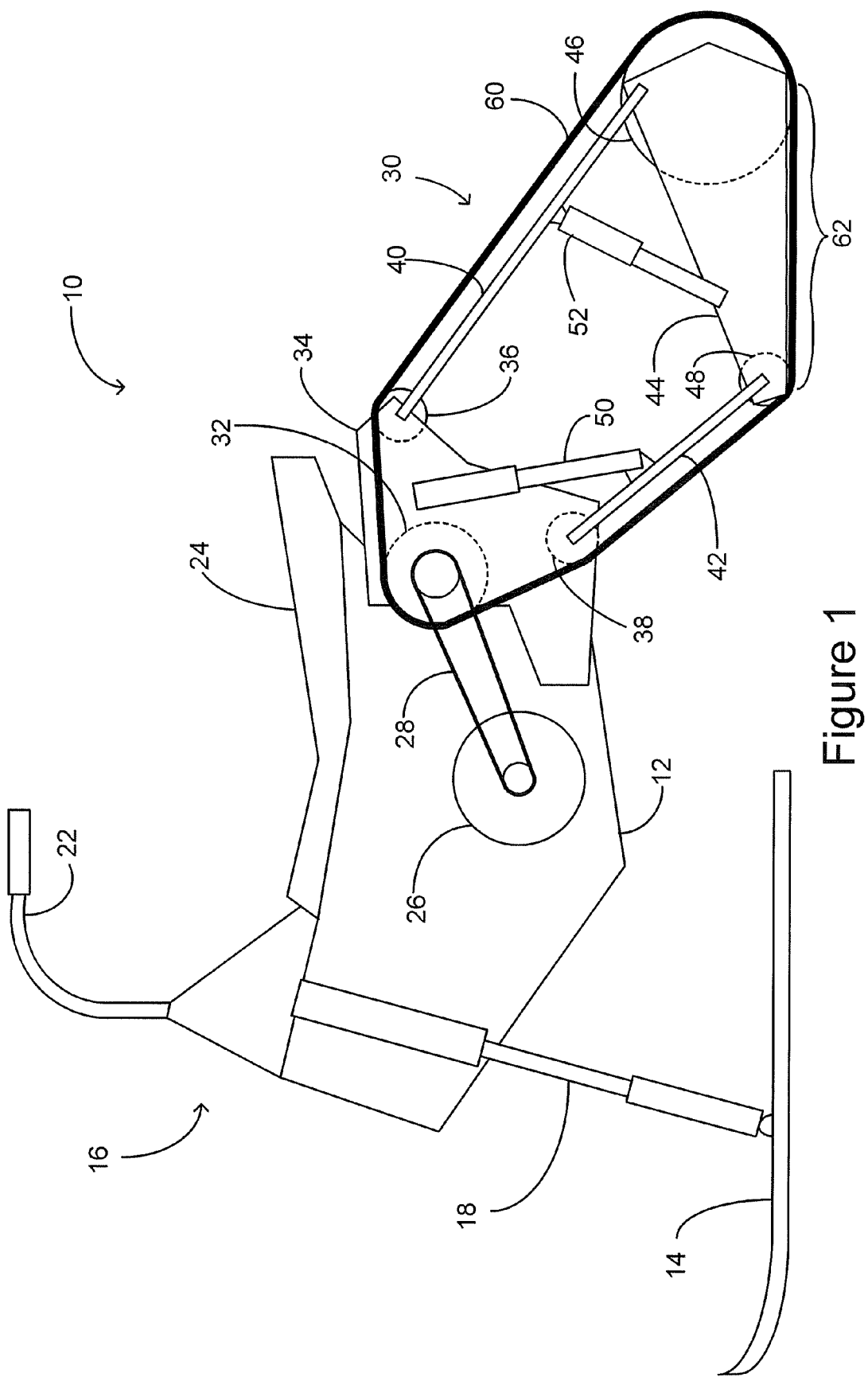
FIG. 1 shows a snowmobile according to one aspect of the invention.

FIG. 1 shows a snowmobile 10 according to one embodiment of the invention. Snowmobile 10 comprises a chassis 12 having skis 14 attached thereto by means of a forward suspension system 16. Forward suspension system 16 may comprise shock absorbers 18 as well as other components such as springs, struts or the like (not shown). Although only the left ski 14 and shock absorber 18 are shown for ease of illustration in FIG. 1, it is to be understood that snowmobile 10 also comprises a right ski 14 and shock absorber 18.

In this description, the terms "front", "rear", "left", "right", "up", "down" and the like are used to refer to directions from the point of view of a rider (not shown). For example, in FIG. 1, elements which are shown closer to the left edge of the drawing sheet are referred to as being located forward of elements which are shown closer to the right edge of the drawing sheet. Also, in this description, the term "shock absorber" is used to refer to any mechanism which dampens the force of an impact and returns to its original position when the force is removed.

A steering assembly 20 is operably coupled to forward suspension system 16 for controlling skis 14. Steering assembly 20 comprises handlebars 22 which may be operated by a rider (not shown) positioned atop a seat 24 attached to the top of chassis 12. A motor 26 is mounted to a lower portion of chassis 12. A chain 28 is connected between motor 26 and a track drive system 30.

Figure 2:
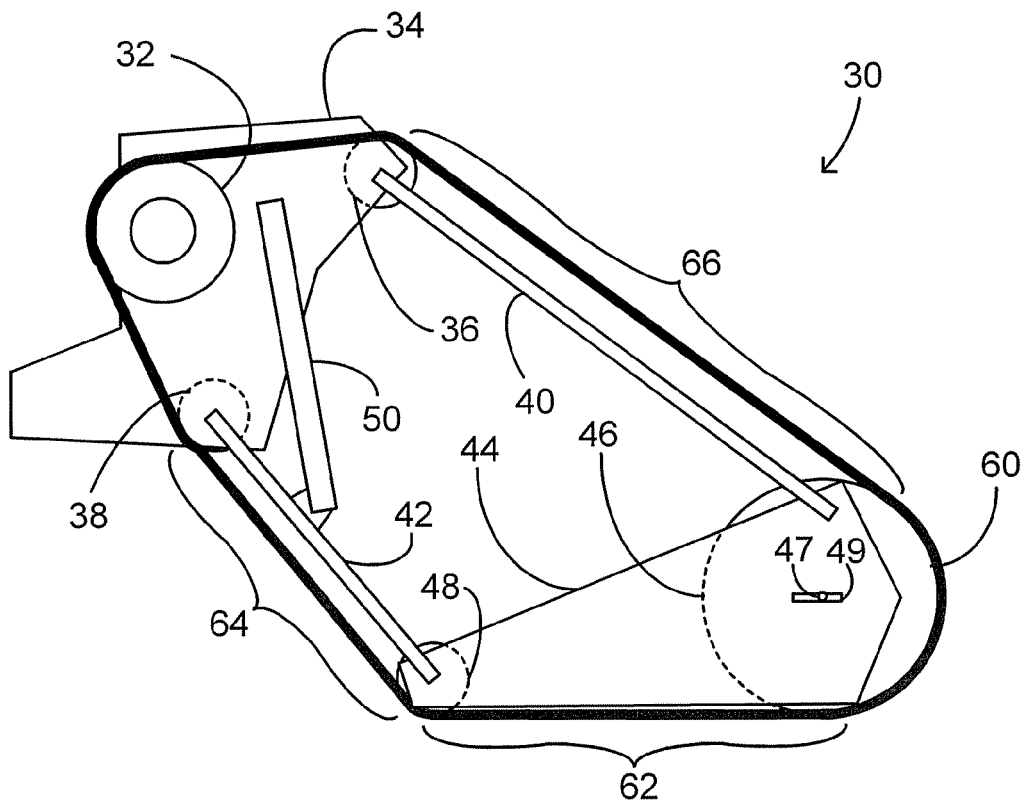
FIG. 2 shows a track drive system according to another aspect of the invention.

Track drive system 30 is shown in isolation in FIG. 2. Track drive system 30 comprises a drive wheel 32 rotatably mounted to a chassis frame 34. Chain 28 transfers rotational energy from motor 26 to drive wheel 32. In the illustrated embodiment, chassis frame 34 is bolted or otherwise detachably secured to chassis 12 so that track drive system 30 can be removed from snowmobile 10 for replacement or repair. Alternatively, chassis frame 34 could be integrally formed with chassis 12.

An upper idler 36 is rotatably attached to chassis frame 34 at a location generally rearwardly displaced from drive wheel 32 by an upper idler offset distance. A forward idler 38 is rotatably attached to chassis frame 34 at a location generally downwardly displaced from drive wheel 32 by a forward idler offset distance.

An upper swing arm 40 and a lower swing arm 42 are each pivotally attached at a location near a forward end thereof to chassis frame 34. Upper swing arm 40 may, for example, be attached to chassis frame 34 at or near an axis of rotation of upper idler 36. Lower swing arm 42 may, for example, be attached to chassis frame 34 at or near an axis of rotation of forward idler 38. Upper and lower swing arms 40 and 42 are each pivotally attached at a location near a rearward end thereof to a suspended frame 44.

A rear idler 46 is rotatably attached to suspended frame 44 at an attachment point 47 located generally downwardly displaced from an attachment location of upper swing arm 40 by a rear idler offset distance. A lower idler 48 is rotatably attached to a forward portion of suspended frame 44. Lower idler 48 may, for example, be rotatably attached to suspended frame at or near an attachment location of lower swing arm 42.

Track drive system 30 comprises biasing means for biasing suspended frame 44 downwardly relative to chassis frame 34. In the illustrated embodiment, the biasing means comprises a shock absorber 50 pivotally connected between chassis frame 34 and lower swing arm 42. Shock absorber 50 is pivotally connected to chassis frame 34 at a location between drive wheel 32 and upper idler 36. Shock absorber 50 is pivotally connected to lower swing arm 42 at a location forward of a center thereof.

As one skilled in the art will appreciate, the biasing means may comprise a structure different from that of the illustrated embodiment. For example, shock absorber 50 may be connected to chassis frame 34 and lower swing arm 42 at different locations. Alternatively, the biasing means could comprise a spring and a separate force dampening mechanism, or the biasing means could comprise a hydraulic or pneumatic system. The biasing means may also optionally comprise a second shock absorber 52 connected between upper swing arm 40 and suspended frame 44, as shown in FIG. 1. As a further alternative, the biasing means may comprise an extension spring coupled between a location near the location at which forward idler 38 is attached to chassis frame 34 and a location near the location at which upper swing arm 40 is coupled to suspended frame 44.

A track 60 is wrapped around drive wheel 32, upper idler 36, rear idler 46, lower idler 48 and forward idler 38. The angle that track 60 wraps around drive wheel 32 is preferably at least one radian, such that the length of the section of track 60 which contacts drive wheel 32 is at least equal to the radius of drive wheel 32. Drive wheel 32 comprises track engaging features (not shown) which engage corresponding features in track 60. The track engaging features may comprise, for example, lugs which are received in recesses on the inside of track 60, protrusions which extend through or into apertures in track 60, or any other suitable means for engaging track 60.

Drive wheel 32, upper idler 36, rear idler 46, lower idler 48 and forward idler 38 may comprise track holding features for preventing track 60 from sliding left or right as track 60 is driven by drive wheel 32. Track drive system 30 may optionally comprise additional idlers (not shown) pivotally attached to upper swing arm 40, lower swing arm 42 and/or suspended frame 44. Track drive system 30 may also optionally comprise slide plates (not shown) mounted on upper swing arm 40, lower swing arm 42 and/or suspended frame 44. Such optional additional idlers and/or slide plates may be used to facilitate maintaining the profile of track 60.

Upper idler 36, forward idler 38, rear idler 46 and lower idler 48 may each comprise a cylinder with a height substantially similar to a width of track 60. Alternatively, upper idler 36, forward idler 38, rear idler 46 and lower idler 48 may each comprise a plurality of smaller coaxial cylinders.

Track 60 has a length such that there is some tension in track 60 when it is in place around drive wheel 32, upper idler 36, rear idler 46, lower idler 48 and forward idler 38. Track 60 may comprise, for example, a standard-sized snowmobile track selected in accordance with the relative positions of drive wheel 32, upper idler 36, rear idler 46, lower idler 48 and forward idler 38. Track 60 may be installed or removed by uncoupling either upper or lower swing arm 40 or 42 from either of chassis frame 34 or suspended frame 44.

The relative positions and radii of drive wheel 32, upper idler 36, rear idler 46, lower idler 48 and forward idler 38, as well as the lengths of upper and lower swing arms 40 and 42, are selected such that a suitable level of tension exists in track 60. A suitable level of tension exists when track 60 is tight enough that drive wheel 32 does not slip when drive wheel 32 is driven by motor 26.

Different users may find different levels of tension in track 60 to be suitable. For example, as shown in FIG. 2, rear idler 46 may be rotatably attached to suspended frame 44 by means of bearings 47. The position of bearings 47 may be adjustable in a forward-rearward direction by mounting bearings 47 in threaded blocks (not shown) which are received in a slot 49, and turning an adjustment screw (not shown) to slide the blocks forward or rearward in slot 49. Alternatively, upper swing arm 40 may comprise oppositely threaded portions at its forward and rearward ends which are engaged by correspondingly threaded portions which are pivotally attached to chassis frame 34 and suspended frame 44, so that turning upper swing arm 40 in one direction increases the tension in track 60 and turning upper swing arm 40 in the other direction decreases the tension in track 60. Other suitable track tensioning mechanisms may also be used. Thus, the user may adjust the tension in track 60 before using the vehicle to which track drive assembly 30 is attached.

Track 60 is driven by drive wheel 32 to circulate around upper idler 36, rear idler 46, lower idler 48 and forward idler 38. A ground-contacting portion 62 of track 60 is defined between the locations at which track 60 contacts rear idler 46 and lower idler 48. A lower swing arm portion 64 of track 60 (see FIGS. 2 and 3) is defined between the locations at which track 60 contacts forward idler 38 and lower idler 48. An upper swing arm portion 66 of track 60 (see FIGS. 2 and 3) is defined between the locations at which track 60 contacts upper idler 38 and rear idler 46.

Figure 3:
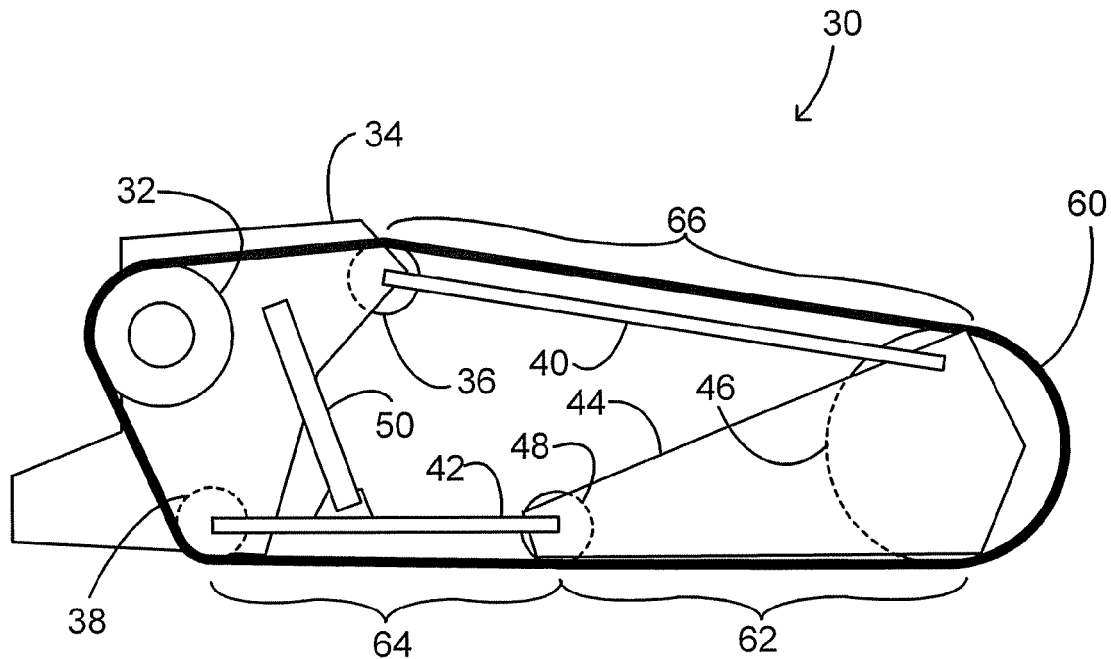
FIG. 3 shows the drive system of FIG. 2 in a compressed position.

Suspended frame 44 is moveable between an extended position, as shown in FIG. 2, and a compressed position, as shown in FIG. 3. The biasing means biases suspended frame 44 downwardly from chassis frame 34 toward the extended position shown in FIG. 2. The lengths of upper and lower swing arms 40 and 42 and the locations where upper and lower swing arms 40 and 42 are pivotally attached to chassis frame 34 and suspended frame 44 are selected such that ground-contacting portion 62 of track 60 remains generally horizontal as suspended frame 44 moves between the extended position and the compressed position. In the extended position, lower swing arm portion 64 of track 60 may be inclined at an angle of up to about 60 degrees from horizontal. In the compressed position, lower swing arm portion 64 of track 60 may be inclined at an angle of between about 0 and 5 degrees from horizontal, for example.

In some embodiments, the relative positions of drive wheel 32, upper idler 36, rear idler 46, lower idler 48 and forward idler 38 and the lengths of upper and lower swing arms 40 and 42 have ratios approximately governed by the following table:

| Dimension | Relative Length |
| --- | --- |
| Rear Idler Offset | 1 |
| Rear Idler Axis-Lower Idler Axis | 4.5 |
| Lower Swing Arm Length | 3.9 |
| Forward Idler Offset | 2.2 |
| Upper Idler Offset | 2.7 |
| Upper Swing Arm Length | 6.7 |

The rear idler offset between attachment point 47 and the location at which upper swing arm 40 is attached to suspended frame 44 allows the tension in track 60 to be substantially maintained as suspended frame 44 moves between the extended and compressed positions. For example, the rear angle offset, in combination with the relative positions and radii of drive wheel 32, upper idler 36, rear idler 46, lower idler 48 and forward idler 38, as well as the lengths of upper and lower swing arms 40 and 42, may be selected such that a perimeter defined by outer edges of drive wheel 32, upper idler 36, rear idler 46, lower idler 48 and forward idler 38 varies less than about 2% as suspended frame 44 moves between the extended position and the compressed position.

In some embodiments, the perimeter varies less than about 1% as suspended frame 44 moves between the extended position and the compressed position.

Figure 4:
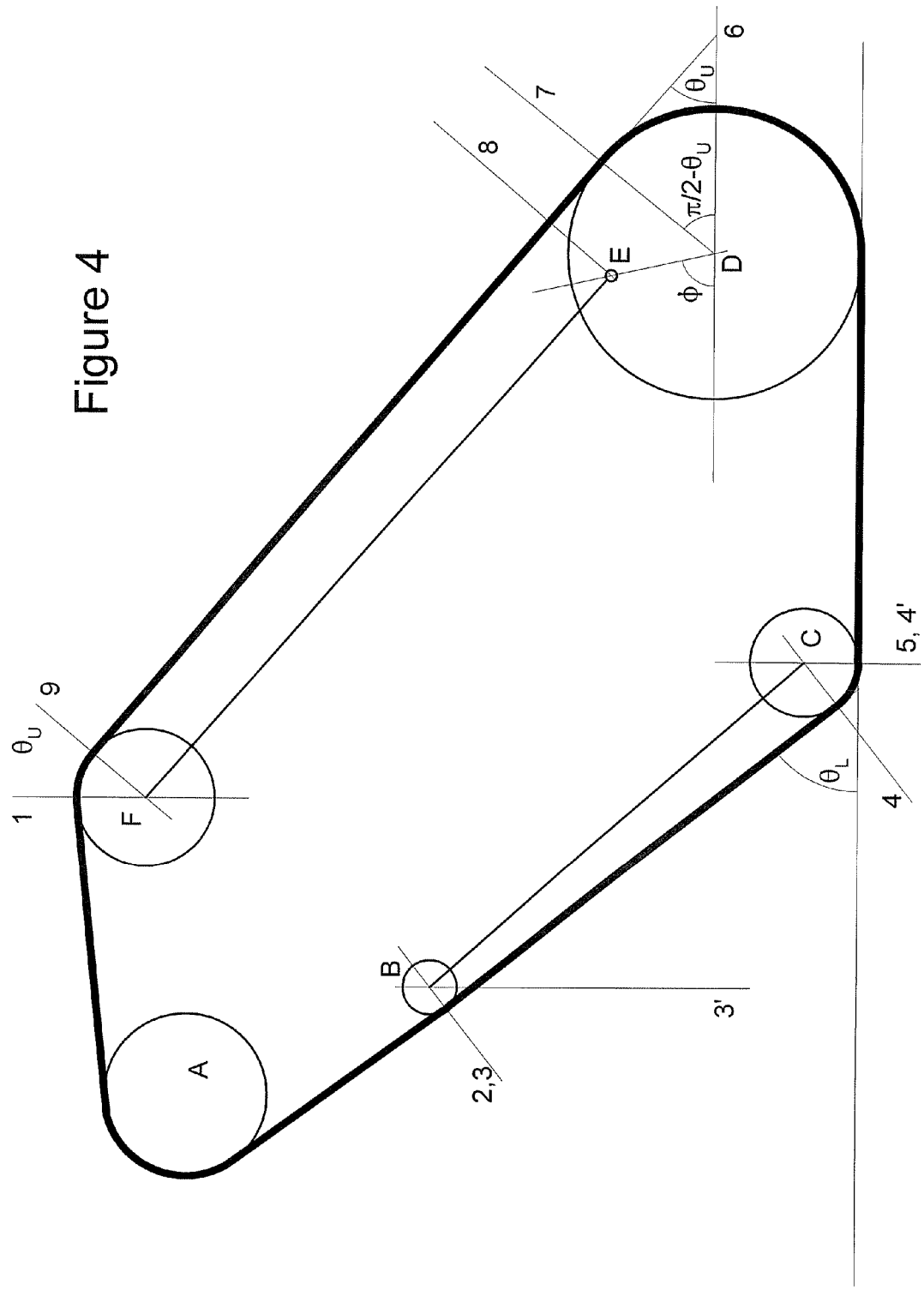
FIG. 4 illustrates geometrical relationships of an example track drive system.

FIG. 4 is a geometric diagram which illustrates an example embodiment wherein the perimeter remains constant as suspended frame 44 moves between the extended position and the compressed position. In FIG. 4, circle A has a radius $r_A$ and represents drive wheel 32. Circle B has a radius $r_B$ and represents forward idler 38. Circle C has a radius $r_C$ and represents lower idler 48. Lower swing arm 42 is pivotally attached between chassis frame 34 and suspended frame 44 (not shown in FIG. 4) at locations which correspond to the centers of circles B and C, respectively. Circle D has a radius $r_D$ and represents rear idler 46. Point E represents the location at which upper swing arm 40 is pivotally attached to suspended frame 44. Circle F has a radius $r_F$ and represents upper idler 36. Upper swing arm 40 is pivotally attached to chassis frame 34 at a location which corresponds to the center of circle F.

Angle $\theta_L$ is the angle between the outer tangent connector of circles B and C and the horizontal. Angle $\theta_U$ is the angle between the outer tangent connector of circles D and F and the horizontal. Angle $\phi$ is the angle between line segment DE and the horizontal. Angles $\theta_L$ and $\theta_U$ vary as suspended frame 44 moves between the extended position and the compressed position. Angle $\phi$ is fixed.

Reference lines 1-9, are shown in FIG. 4 to assist in describing the perimeter P around circles A, B, C, D and F indicated by the heavy weight line. Reference line 1 is vertical and extends through the center of circle F. Reference line 2 is perpendicular to the outer tangent connector of circles A and B and extends through the center of circle B. Reference line 3 is perpendicular to the outer tangent connector of circles B and C and extends through the center of circle B. Reference lines 2 and 3 may be collinear, or almost collinear, in the extended position shown in FIG. 4. Reference line 3 approaches the vertical as $\theta_L$ approaches zero in the compressed position, as indicated by reference line 3'.

Reference line 4 is perpendicular to the outer tangent connector of circles B and C and extends through the center of circle C. Reference line 5 is perpendicular to the outer tangent connector of circles C and D (i.e. vertical) and extends through the center of circle C. Reference lines 4 and 5 may be collinear, or almost collinear, as $\theta_L$ approaches zero in the compressed position, as indicated by reference line 4'.

Reference line 6 is horizontal and extends through the center of circle D. Reference line 7 is perpendicular to the outer tangent connector of circles D and F and extends through the center of circle D. Reference line 8 is perpendicular to the outer tangent connector of circles D and F and extends through point E. Reference line 9 is perpendicular to the outer tangent connector of circles D and F and extends through the center of circle F.

It is useful to consider the perimeter in segments. For example, the lengths of segments 1-2, 3-4, 5-6 and 8-9 remain constant, and do not depend on either $\theta_L$ or $\theta_U$. Thus, the lengths of segments 1-2, 3-4, 5-6 and 8-9 may be collectively referred to as $P_{const}$. The length of segment 2-3 is given by $r_B \theta_L$. The length of segment 4-5 is given by $r_C \theta_L$. The length of segment 6-7 is given by $r_D(\pi/2 - \theta_U)$. The length of segment 7-8 is given by $L_{DE} \sin(\pi/2 + \theta_U - \phi)$. The length of segment 9-1 is given by $r_F \theta_U$. Thus, if $$P_{var} = (r_B + r_C)\theta_L + r_D(\pi/2 - \theta_U) + L_{DE}\sin(\pi/2 + \theta_U - \phi) + r_F \theta_U$$ (Equation 1)

remains constant as $\theta_L$ and $\theta_U$ vary as suspended frame 44 moves between the extended position and the compressed position, the perimeter $P=P_{const}+P_{var}$ around circles A, B, C, D and F remains constant.

Figure 5:
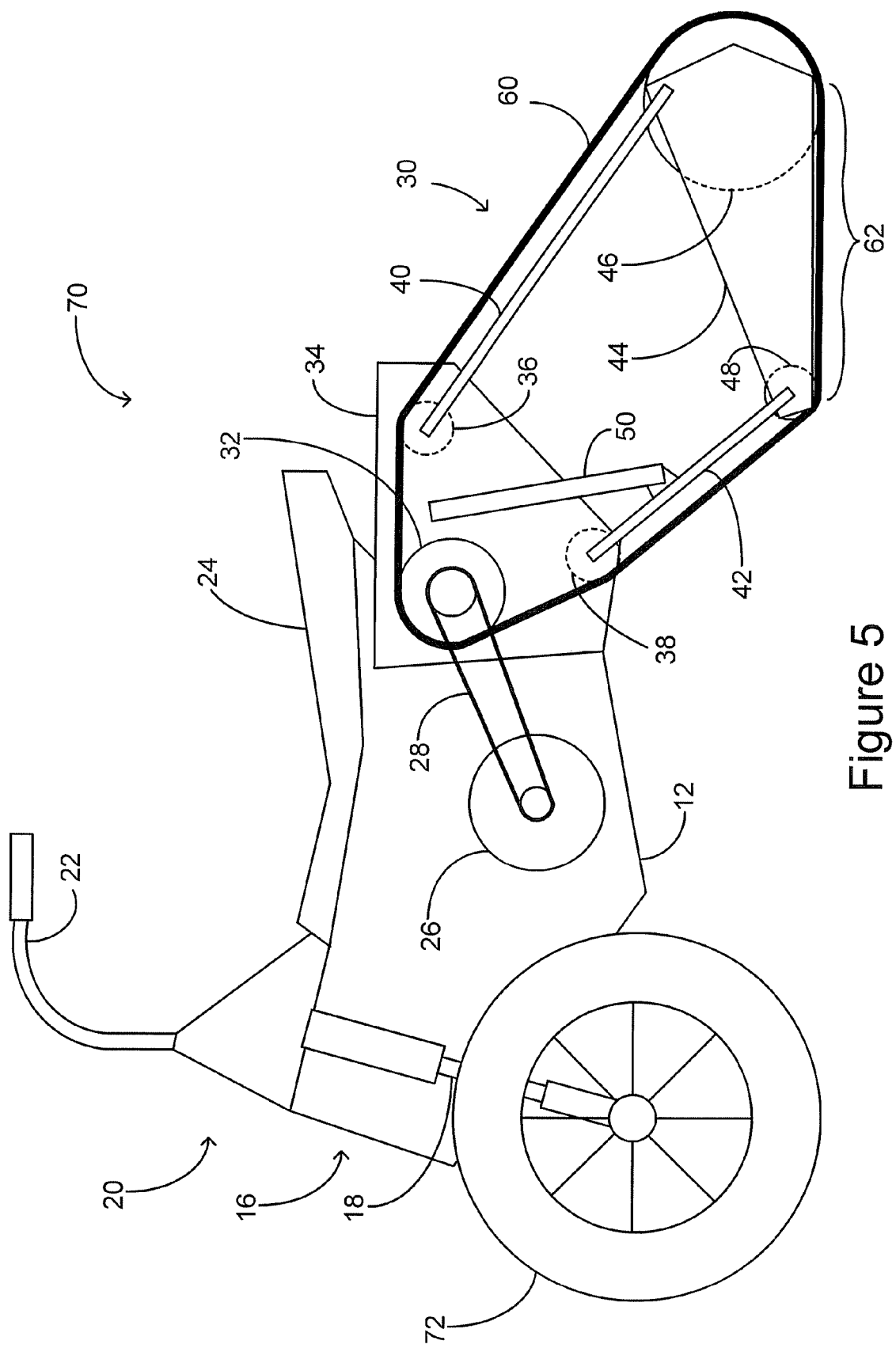
FIG. 5 shows a vehicle according to one aspect of the invention.

Track drive system 30 may be attached to vehicles other than snowmobiles. For example, FIG. 5 shows an all terrain vehicle (ATV) 70 with track drive system 30 attached thereto. ATV 70 differs from snowmobile 10 of FIG. 1 in that a pair of wheels 72 are attached to forward suspension system 16 instead of skis 14. Also, in the embodiment of FIG. 5, chassis frame 34 has a different shape than in the embodiment of FIG. 1. The shapes of chassis frame 34 and suspended frame 44 may vary without affecting the operation of track drive system 30, provided that neither chassis frame 34 nor suspended frame 44 extend below lower swing arm portion 64 or ground-contacting portion 62 of track 60, respectively.

Figure 6:
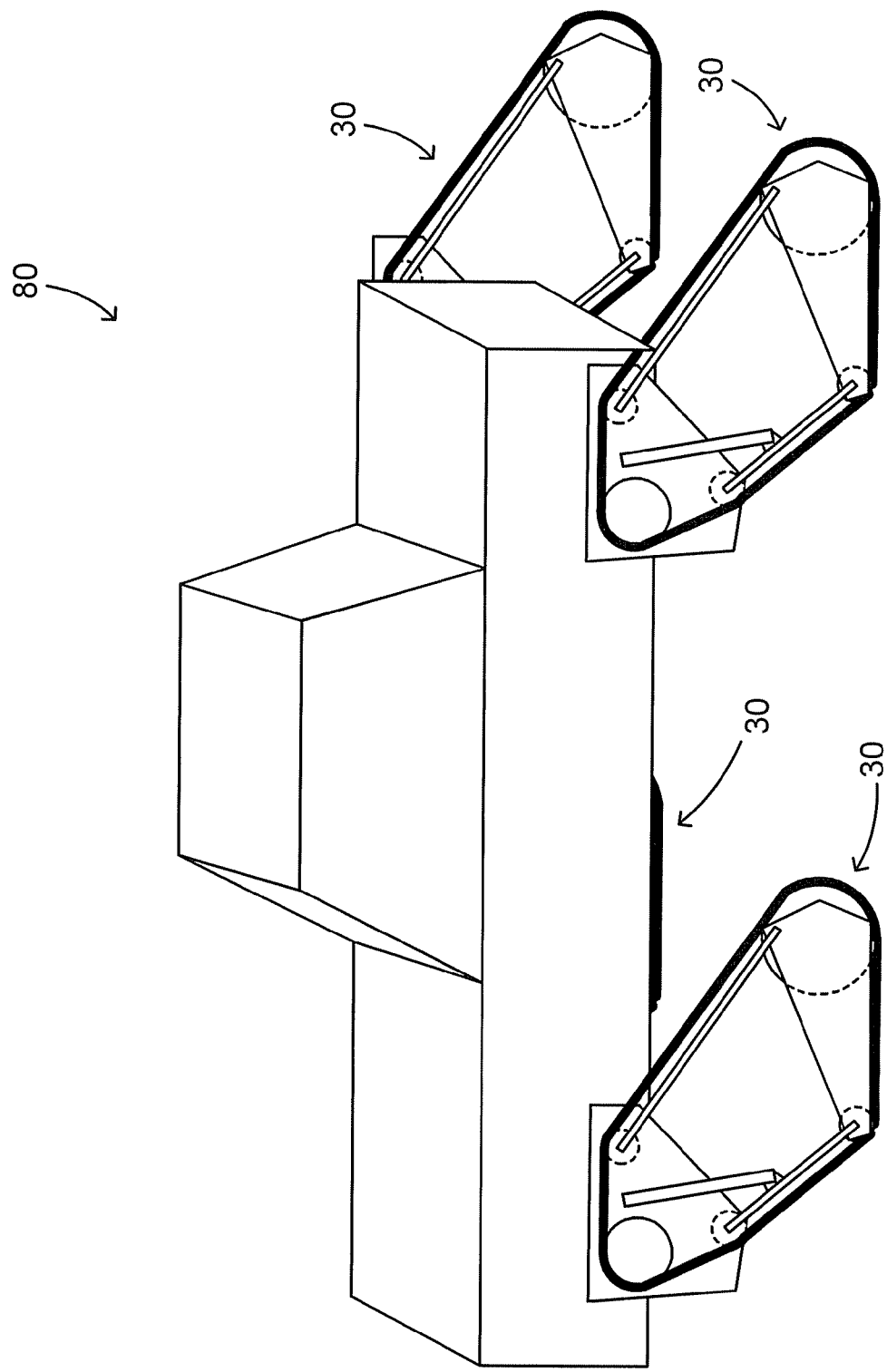
FIG. 6 shows a vehicle having four track drive systems in place of wheels according to another aspect of the invention; and, FIG. 7 shows a snowmobile chassis according to another aspect of the invention.

A pair of track drive systems 30 may be used in place of a pair of wheels in any vehicle. FIG. 6 shows an example vehicle 80 comprising an all wheel drive automobile in which the wheels have all been replaced with track drive systems 30. As another example, either the forward or rearward pair of wheels, or both, of a 4 wheel ATV may be replaced with track drive systems 30 according to the invention. In some such embodiments, the biasing means may comprise a hydraulic system which controls the position of suspended frame 44 relative to chassis frame 34 to aid in cornering. For example, shock absorbers 50 may be replaced with hydraulic cylinders which are coupled to a control system, such that each of the hydraulic cylinders may be independently controlled. Thus, the control system may cause track drive systems 30 on the side to which a vehicle is turning to move towards the compressed position or some intermediate position, while maintaining track drive systems 30 on the outside of the turn in the extended position.

FIG. 7 shows a snowmobile chassis 90 according to another embodiment of the invention. Chassis 90 has a pair of track drive systems 30 attached to a forward portion thereof by a drive axle 92. A ski 94 is attached to a rearward portion of chassis 90.

As will be apparent to those skilled in the art in the light of the foregoing disclosure, many alterations and modifications are possible in the practice of this invention without departing from the spirit or scope thereof. While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A track drive system comprising:
    a chassis frame;
    a drive wheel rotatably coupled to the chassis frame;
    an upper idler rotatably coupled to the chassis frame rearwardly of the drive wheel;
    a forward idler rotatably coupled to the chassis frame below the drive wheel;
    a suspended frame;
    a rear idler rotatably coupled to a rear portion of the suspended frame;
    a lower idler rotatably coupled to a forward portion of the suspended frame;
    an upper swing arm having forward and rearward ends, the upper swing arm pivotally coupled at the forward end thereof to the chassis frame, and pivotally coupled at the rearward end thereof to the suspended frame at a location displaced generally upwardly from an axis of the rear idler by a rear idler offset distance;
    a lower swing arm having forward and rearward ends, the lower swing arm pivotally coupled at the forward end thereof to the chassis frame and pivotally coupled at the rearward end thereof to the suspended frame; and
    a biasing means for biasing the suspended frame away from the chassis frame,
    wherein the suspended frame is moveable between an extended position and a compressed position, and a perimeter defined around the drive wheel, upper idler, rear idler, lower idler and forward idler remains substantially constant as the suspended frame moves between the extended position and the compressed position.

2. A track drive system according to claim 1 wherein lengths of the upper and lower swing arms are selected such that a ground-contacting portion of the track extending between the lower idler and the rear idler maintains a substantially horizontal orientation as the suspended frame moves between the extended position and the compressed position.

3. A track drive system according to claim 1 wherein the forward end of the upper swing arm is pivotally coupled to the chassis frame at a location in line with an axis of the upper idler.

4. A track drive system according to claim 1 wherein the forward end of the lower swing arm is pivotally coupled to the chassis frame at a location in line with an axis of the forward idler.

5. A track drive system according to claim 1 wherein the rearward end of the lower swing arm is pivotally coupled to the suspended frame at a location in line with an axis of the lower idler.

6. A track drive system according to claim 1 wherein the biasing means comprises a shock absorber pivotally coupled at one end thereof to the chassis frame at a location between the drive wheel and the upper idler and pivotally coupled at an opposite end thereof to the lower swing arm at a location forward of a center of the lower swing arm.

7. A track drive system according to claim 1 wherein the biasing means comprises first and second shock absorbers, the first shock absorber pivotally coupled at one end thereof to the chassis frame and pivotally coupled at an opposite end thereof to the lower swing arm, and the second shock absorber pivotally coupled at one end thereof to the upper swing arm and pivotally coupled at an opposite end thereof to the suspended frame.

8. A track drive system according to claim 1 wherein the perimeter varies less than two percent as the suspended frame moves between the extended position and the compressed position.

9. A track drive system according to claim 1 wherein the perimeter varies less than one percent as the suspended frame moves between the extended position and the compressed position.

10. A track drive system according to claim 1 wherein the upper swing arm has a length of approximately 6.7 times the rear idler offset distance.

11. A track drive system according to claim 10 wherein the lower swing arm has a length of approximately 3.9 times the rear idler offset distance.

12. A track drive system according to claim 11 wherein a distance between axes of the rear idler and the lower idler is approximately 4.5 times the rear idler offset distance.

13. A track drive system according to claim 12 wherein a distance between axes of the drive wheel and the forward idler is approximately 2.2 times the rear idler offset distance.

14. A track drive system according to claim 13 wherein a distance between axes of the drive wheel and the upper idler is approximately 2.7 times the rear idler offset distance.

15. A track drive system according to claim 1 wherein:

$$(r_B+r_C)\theta_L + r_D(\pi/2-\theta_U) + L_{DE}\sin(\pi/2+\theta_U-\phi) + r_F\theta_U$$

remains constant as the suspended frame moves between the extended position and the compressed position, wherein:
  $r_B$ is a radius of the forward idler;
  $r_C$ is a radius of the lower idler;
  $r_D$ is a radius the rear idler;
  $r_F$ is a radius of the upper idler;
  $L_{DE}$ is the rear idler offset distance;
  $\theta_L$ is an angle between the horizontal and an outer tangent connector of the forward and lower idlers;
  $\theta_U$ is an angle between the horizontal and an outer tangent connector of the rear idler and the upper idler; and
  $\phi$ is an angle between the horizontal and a line which passes through the axis of the rear idler and the location at which the upper swing arm is pivotally attached to the suspended frame.

16. A vehicle comprising:
a chassis;
a steering means coupled to the chassis;
a steering mechanism operably coupled to the steering means;
a motor coupled to the chassis; and,
a track drive system comprising:
  a chassis frame coupled to the chassis;
  a drive wheel rotatably coupled to the chassis frame and coupled to be driven by the motor;
  an upper idler rotatably coupled to the chassis frame rearwardly of the drive wheel;
  a forward idler rotatably coupled to the chassis frame below the drive wheel;
  a suspended frame;
  a rear idler rotatably coupled to a rear portion of the suspended frame;
  a lower idler rotatably coupled to a forward portion of the suspended frame;
  an upper swing arm having forward and rearward ends, the upper swing arm pivotally coupled at the forward end thereof to the chassis frame, and pivotally coupled at the rearward end thereof to the suspended frame at a location displaced generally upwardly from an axis of the rear idler by a rear idler offset distance;
  a lower swing arm having forward and rearward ends, the lower swing arm pivotally coupled at the forward end thereof to the chassis frame and pivotally coupled at the rearward end thereof to the suspended frame; and
  a biasing means for biasing the suspended frame away from the chassis frame,
wherein the suspended frame is moveable between an extended position and a compressed position, and a perimeter defined around the drive wheel, upper idler, rear idler, lower idler and forward idler remains substantially constant as the suspended frame moves between the extended position and the compressed position.

17. A vehicle according to claim 16 comprising a snowmobile, wherein the steering means comprises a pair of skis.

18. A vehicle according to claim 16 comprising an all terrain vehicle, wherein the steering means comprises a pair of wheels.

19. A vehicle comprising:
a chassis;
a motor coupled to the chassis;
a first track drive system comprising:
  a first chassis frame coupled to the chassis;
  a first drive wheel rotatably coupled to the first chassis frame and coupled to be driven by the motor;
  a first upper idler rotatably coupled to the first chassis frame rearwardly of the first drive wheel;
  a first forward idler rotatably coupled to the first chassis frame below the first drive wheel;
  a first suspended frame;
  a first rear idler rotatably coupled to a rear portion of the first suspended frame;
  a first lower idler rotatably coupled to a forward portion of the first suspended frame;
  a first upper swing arm having forward and rearward ends, the first upper swing arm pivotally coupled at the forward end thereof to the first chassis frame, and pivotally coupled at the rearward end thereof to the first suspended frame at a location displaced generally upwardly from an axis of the first rear idler by a first rear idler offset distance;
  a first lower swing arm having forward and rearward ends, the lower swing arm pivotally coupled at the forward end thereof to the first chassis frame and pivotally coupled at the rearward end thereof to the first suspended frame; and
  a first biasing means for biasing the first suspended frame away from the first chassis frame,
wherein the first suspended frame is moveable between an extended position and a compressed position, and a perimeter defined around the first drive wheel, first upper idler, first rear idler, first lower idler and first forward idler remains substantially constant as the first suspended frame moves between the extended position and the compressed position;
a steering means coupled to the chassis, the steering means comprising:
  a second track drive system comprising:
    a second chassis frame coupled to the chassis;
    a second drive wheel rotatably coupled to the second chassis frame and coupled to be driven by the motor;
    a second upper idler rotatably coupled to the second chassis frame rearwardly of the second drive wheel;
    a second forward idler rotatably coupled to the second chassis frame below the second drive wheel;
    a second suspended frame;
    a second rear idler rotatably coupled to a rear portion of the second suspended frame;
    a second lower idler rotatably coupled to a forward portion of the second suspended frame;
    a second upper swing arm having forward and rearward ends, the second upper swing arm pivotally coupled at the forward end thereof to the second chassis frame, and pivotally coupled at the rearward end thereof to the second suspended frame at a location displaced generally upwardly from an axis of the second rear idler by a second rear idler offset distance;
    a second lower swing arm having forward and rearward ends, the lower swing arm pivotally coupled at the forward end thereof to the second chassis frame and pivotally coupled at the rearward end thereof to the second suspended frame; and
    a second biasing means for biasing the second suspended frame away from the second chassis frame, wherein the second suspended frame is moveable between an extended position and a compressed position, and a perimeter defined around the second drive wheel, second upper idler, second rear idler, second lower idler and second forward idler remains substantially constant as the second suspended frame moves between the extended position and the compressed position; and, a third track drive system comprising:

a third chassis frame coupled to the chassis;

a third drive wheel rotatably coupled to the third chassis frame and coupled to be driven by the motor;

a third upper idler rotatably coupled to the third chassis frame rearwardly of the third drive wheel;

a third forward idler rotatably coupled to the third chassis frame below the third drive wheel;

a third suspended frame;

a third rear idler rotatably coupled to a rear portion of the third suspended frame;

a third lower idler rotatably coupled to a forward portion of the third suspended frame;

a third upper swing arm having forward and rearward ends, the third upper swing arm pivotally coupled at the forward end thereof to the third chassis frame, and pivotally coupled at the rearward end thereof to the third suspended frame at a location displaced generally upwardly from an axis of the third rear idler by a third rear idler offset distance;

a third lower swing arm having forward and rearward ends, the lower swing arm pivotally coupled at the forward end thereof to the third chassis frame and pivotally coupled at the rearward end thereof to the third suspended frame; and a third biasing means for biasing the third suspended frame away from the third chassis frame, wherein the third suspended frame is moveable between an extended position and a compressed position, and a perimeter defined around the third drive wheel, third upper idler, third rear idler, third lower idler and third forward idler remains substantially constant as the third suspended frame moves between the extended position and the compressed position; and, a steering mechanism operably coupled to the steering means.

20. A vehicle according to claim 19 wherein the second and third biasing means each comprise a hydraulic system.

\* \* \* \* \*